US009225689B2

(12) United States Patent
Lorch

(10) Patent No.: US 9,225,689 B2
(45) Date of Patent: Dec. 29, 2015

(54) HARDWARE SECURITY AGENT FOR NETWORK COMMUNICATIONS

(71) Applicant: Robert Lorch, Bad Schönborn (DE)

(72) Inventor: Robert Lorch, Bad Schönborn (DE)

(73) Assignee: SAP SE, Walldorf (DE)

( * ) Notice: Subject to any disclaimer, the term of this patent is extended or adjusted under 35 U.S.C. 154(b) by 69 days.

(21) Appl. No.: 14/194,329

(22) Filed: Feb. 28, 2014

(65) Prior Publication Data

US 2015/0249646 A1    Sep. 3, 2015

(51) Int. Cl.
*H04L 29/06* (2006.01)
*G06F 21/60* (2013.01)

(52) U.S. Cl.
CPC .......... *H04L 63/0414* (2013.01); *G06F 21/606* (2013.01); *H04L 63/10* (2013.01)

(58) Field of Classification Search
CPC ............................ H04L 63/0407; G06F 21/00
See application file for complete search history.

(56) References Cited

U.S. PATENT DOCUMENTS 6,606,663 B1 *  8/2003  Liao et al. ...................... 709/229
8,171,538 B2 *  5/2012  El Husseini et al. ............ 726/12
8,955,155 B1 *  2/2015  Allen ............................... 726/29
2005/0086160 A1 *  4/2005  Wong et al. ...................... 705/39
2006/0122943 A1 *  6/2006  Mann et al. ...................... 705/65
2007/0169202 A1 *  7/2007  Goldberg et al. ............... 726/26
2008/0134305 A1 *  6/2008  Hinton et al. ...................... 726/5
2010/0199086 A1 *  8/2010  Kuang et al. ...................... 726/5
2014/0019367 A1 *  1/2014  Khan et al. ...................... 705/75

OTHER PUBLICATIONS

"Transaction Authentication Number" retrieved from http://en.wikipedia.org/wiki/Transaction_authentication_number, Apr. 29, 2013, 3 pages.
"IDenticard" retrieved from http://www.identicard.com/identification-solutions/id-cards-and-badges/card-security/, Feb. 2, 2014, 17 pages.

* cited by examiner

*Primary Examiner* — Matthew Smithers
(74) *Attorney, Agent, or Firm* — Brake Hughes Bellermann LLP

(57) ABSTRACT

A hardware security agent may include a request inspector configured to receive an alias at the hardware security agent by way of a network interface of an untrusted computer, and a mapper configured to map the alias to corresponding protected data stored within the hardware security agent. The hardware security agent may further include a substitution manager configured to provide the corresponding protected data from the hardware security agent over a network to a target network site.

20 Claims, 6 Drawing Sheets

HARDWARE SECURITY AGENT FOR NETWORK COMMUNICATIONS

TECHNICAL FIELD

This description relates to conducting secure network communications.

BACKGROUND

Computer networks, particularly public computer networks such as the internet, provide a common source of vulnerability with respect to protecting a confidentiality and integrity of data of users of the networks. For example, such network users may wish to manage personal bank accounts, perform online shopping or other business transactions, or send and receive personal, private email messages.

In these and other such web-based applications, the security of personal and private data is often maintained using confidential username/password combinations, or other user-specific credentials. Consequently, if a security of such user credentials is compromised, such as when a username/password of a user is intercepted over the network, then individual and financial information of the user, (e.g., bank account or credit card information, or personal emails) may be compromised. Further, in situations in which the network user is an employee of a business, and is provided with access to data that is confidential to the business, then a compromise of the user's credentials with respect to accessing business applications of the business often means that the business data is also compromised.

In many scenarios, such as when a network user is traveling, the network user may wish to make use of public access to the internet, and/or may utilize a publicly-available network computer (such as, for example in the context of an internet café, coffee shop, library, or other public venue). Such network environments, including such publicly-available network computers, may be particularly susceptible to attacks by malicious network users.

For example, a publicly-available computer may be infected by a computer virus. Then, such computer viruses may use, e.g., a keyboard logger, a network sniffer, or a full recording of a user session of a network user, in order to obtain, e.g., any user credentials provided by the network user during the session. Then, the malicious user may thus be provided with full access to any network sites which authorize use thereof based on the credentials. Thus, in these and other scenarios, a confidentiality and/or integrity of personal or business data may be compromised, which may lead to inconveniences, financial losses, or harm to a reputation of the network user, or of the associated business.

SUMMARY

According to one general aspect, a hardware security agent may include instructions recorded on a non-transitory computer-readable medium, and executable by at least one processor. The hardware security agent may include a request inspector configured to receive an alias at the hardware security agent by way of a network interface of an untrusted computer, and a mapper configured to map the alias to corresponding protected data stored within the hardware security agent. The hardware security agent may further include a substitution manager configured to provide the corresponding protected data from the hardware security agent over a network to a target network site.

According to another general aspect, a computer-implemented method for executing instructions stored on a non-transitory computer readable storage medium may include receiving an alias at a hardware security agent by way of a network interface of an untrusted computer, mapping the alias to corresponding protected data stored within the hardware security agent, and providing the corresponding protected data from the hardware security agent over a network to a target network site.

According to another general aspect, a computer program product, tangibly embodied on a non-transitory computer-readable storage medium, may include instructions that, when executed by at least one processor, cause the at least one processor to receive an alias at a hardware security agent by way of a network interface of an untrusted computer, map the alias to corresponding protected data stored within the hardware security agent, and provide the corresponding protected data from the hardware security agent over a network to a target network site.

The details of one or more implementations are set forth in the accompanying drawings and the description below. Other features will be apparent from the description and drawings, and from the claims.

DETAILED DESCRIPTION

Figure 1:
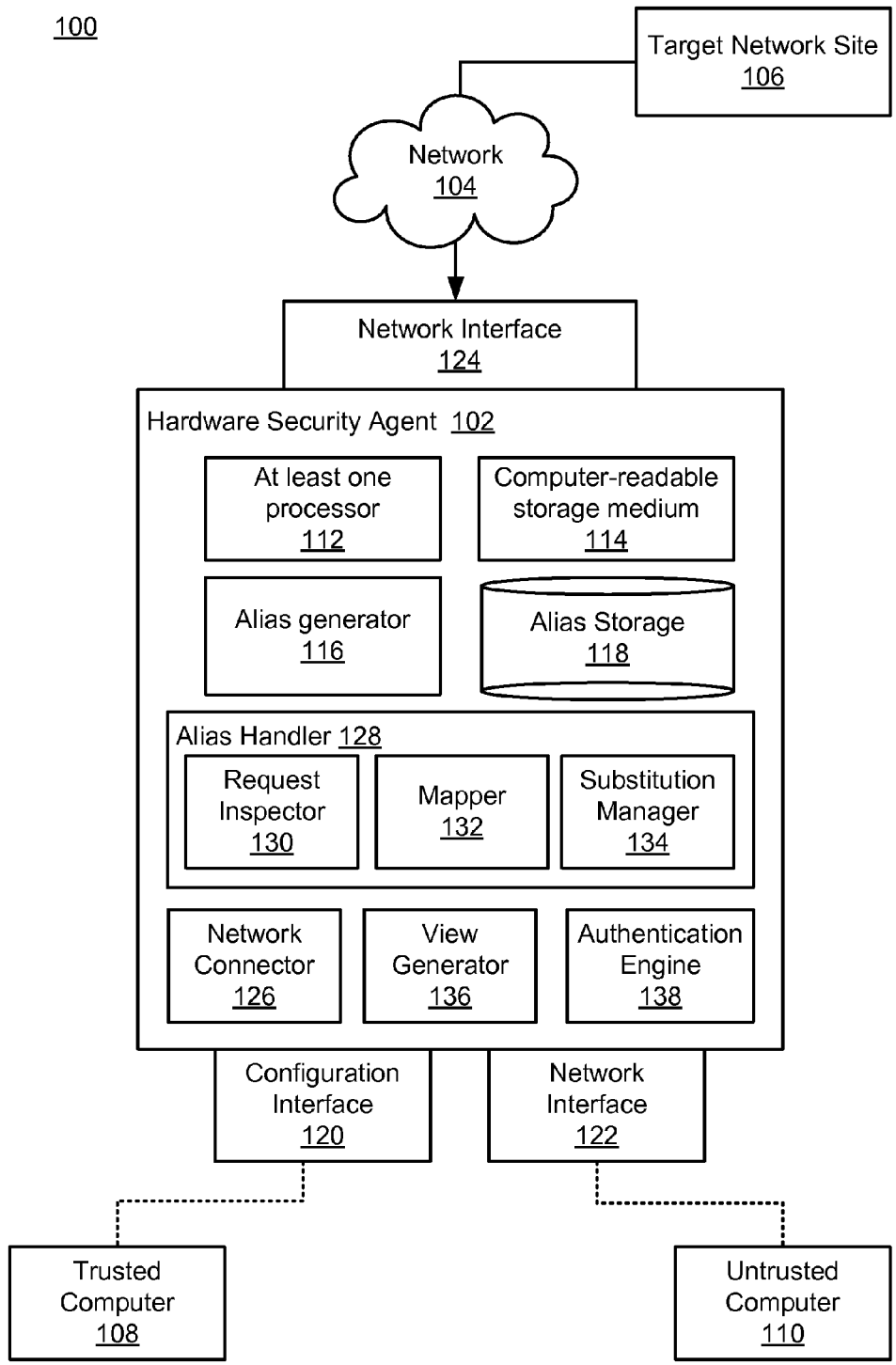
FIG. 1 is a block diagram of a system including a hardware security agent for securing network communications.

FIG. 1 is a block diagram of a system 100 utilizing a hardware security agent 102 for network communications over a network 104. Specifically, as shown, the hardware security agent 102 may be utilized to communicate with a target network site 106 of the network 104, and thereby mediate such network communications, using both a trusted computer 108 and/or an untrusted computer 110.

More specifically, as described in detail below, the hardware security agent 102 may be utilized to interact with the trusted computer 108 to configure one or more simplified aliases to be used in communicating with the target network site 106. For example, such simplified aliases may be configured to be associated with, e.g., private user credentials of a user of the trusted computer 108 used to access the user's account at the target network site 106, and/or aliases for credit card information or other financial information of the user of the trusted computer 108 used, e.g., to facilitate a commercial transaction with the target network site 106.

As further described, such aliases may be uniquely associated with the corresponding, actual confidential credentials and/or financial information. Then, at a later time, when the same user is required to utilize the untrusted computer 110 to communicate over the network 104 with the target network site 106, the untrusted computer 110 is prevented from ever processing or otherwise receiving or detecting the authentic, confidential information (e.g., the actual user credentials and/or financial information).

Thus, in such example implementations, the user of the system 100 may utilize the untrusted computer 110, even if the untrusted computer 110 is currently infected with one or more computer viruses designed to intercept and steal confidential information. For example, the user may conduct any desired transaction or interaction with the target network site 106, without compromising any confidentiality or integrity of whatever confidential information is protected through the use of the aliases implemented by the hardware security agent 102.

In specific example implementations, as illustrated in more detail below, e.g., with respect to FIGS. 3 and 4, the hardware security agent 102 may represent a small, conveniently-sized hardware component, that may be easily transported by the user of the system 100. The hardware security agent 102 may include, as shown, at least one semiconductor processor 112, as well as appropriate non-transitory computer readable storage medium 114. That is, as would be appreciated, various instructions may be stored on the non-transitory computer readable storage medium 114, for processing thereof by the at least one processor 112, to thereby provide various features and functions described below with respect to the various components and subcomponents of the hardware security agent 102.

For example, the computer readable storage medium 114 may store instructions for execution by the at least one processor 112, to thereby provide an alias generator 116. As described in detail below, the alias generator 116 may interact with the user of the system 100, by way of the trusted computer 108, to thereby generate an alias corresponding to each piece or type of confidential data to be protected, so that each such alias and associated confidential data may be stored together within the alias storage 118. It may be appreciated that although the alias storage 118 is illustrated separately from the computer readable storage medium 114 for purposes of clarity and convenience in explaining operations of the hardware security agent 102, the computer readable storage medium 114, or portions thereof, may be utilized to store data of the alias storage 118, or other data utilized by the hardware security agent 102, in addition to actual instructions processed by the at least one processor 112 to provide the various features and functions of the hardware security agent 102 described herein.

In specific implementations, the trusted computer 108 may be connected to a configuration interface 120 to allow the user of the system 100 to interact with the alias generator 116. Specific examples of operations of the alias generator 116 in this regard are described in more detail below, e.g., with respect to FIGS. 3 and 5. However, with respect to FIG. 1, it may generally be appreciated that, in practice, the user of the system 100 may wish to configure the hardware security agent 102 in conjunction with use of the trusted computer 108, where the trusted computer 108 may be understood to represent, for example, a personal/home computer of the user, a business computer provided and secured by an employer of the user, or any computer which the user is confident is not infected by a computer virus or otherwise compromised from a security perspective.

In order to maintain the security of the trusted computer 108, the configuration interface 120 may be understood to represent a non-network interface (i.e., with respect to the network 104). For example, the configuration interface 120 may represent a universal serial bus (USB) port. In other example implementations, the configuration interface 120 could represent any hard-wired or wireless connection, (e.g., firewire connection, or Bluetooth connection) that does not rely on, or interact with network communications that could potentially serve as a point of vulnerability with respect to intercepting communications between the trusted computer 108 and the hardware security agent 102.

In operation, the user may thus utilize the trusted computer 108 to identify the target network site 106 to be accessed, or to otherwise identify confidential data to be protected through the use of the alias generator 116, such as credit card information. Then, the user may provide an individual alias for each discrete piece of information to be protected. The user may provide an alias with respect to a username and/or password used to access the user's account at the target network site 106. Advantageously, such alias may be a simplified, easy-to-remember alias, which need not be subject to normal password strength requirements. Consequently, as may be appreciated from the below description, the use of such aliases enables the user of the system 100 to utilize easily-remembered aliases, thus lessening a burden on the user when interacting with a large number of individual network sites and/or when utilizing a plurality of credit cards or other financial assets. Thus, the alias generator 116 may be utilized to store each such alias, and associated confidential information, within the alias storage 118.

At a later time, the user may travel to a location of an untrusted computer 110, as referenced above. When wishing to utilize the untrusted computer 110 to access the network 104, and thereby the target network site 106, the user may connect the untrusted computer 110 to a network interface 122 of the hardware security agent 102.

For example, the network interface 122 may represent an Ethernet port of the hardware security agent 102. Similarly, the user may utilize a second network interface 124 to connect the hardware security agent 102 to the network 104. For example, the network interface 124 may represent a second Ethernet port, which may be connected to a network router at the location of the untrusted computer 110, as illustrated and described in more detail below with respect to FIGS. 3-4.

In other example implementations, however, the network interface 124 might represent a wireless interface, which utilizes a wireless network adaptor to connect to the network 104. In this regard, the hardware security agent 102 is illustrated as including a network connector 126, which may thus be understood to represent any appropriate type of network connector, depending on whether the user wishes to connect with the network 104 utilizing an available wire or wireless connection.

In this way, as illustrated in FIG. 1, the hardware security agent 102 may be installed as a mediating agent between the untrusted computer 110 and the network 104. At this point, the user of the system 100 may utilize the untrusted computer 110, e.g., a browser application executed using the untrusted computer 110, to identify the target network site 106, for the purpose of connecting to the target network site 106.

As described in detail below, the request from the untrusted computer 110 to connect with the target network site 106 may represent an otherwise-standard network request. In fact, the request may be implemented as a non-secure network request, since the untrusted computer 110 is already suspected of potential malicious activity, and is therefore not trusted with any confidential information.

Instead, the request, as well as future requests and responses communicated between the target network site 106 and the untrusted computer 110, may be mediated by an alias handler 128 of the hardware security agent 102. Specifically, as shown, a request inspector 130 may inspect the initially-received request for connection to the target network site 106, and may inspect the received request to determine inclusion of an alias previously-stored within the alias storage 118 as being associated with the target network site 106.

Thus, a mapper 132 may map the received alias to corresponding secure credentials associated with the target network site 106 within the alias storage 118. Then, a substitution manager 134 may substitute the actual, confidential credentials for the alias within the request, and may forward the modified request by way of the network interface 124, and over the network 104, to thereby authenticate the user for a session within the user's account at the target network site 106.

As may be appreciated, from the perspective of the target network site 106, there is no need for the target network site 106 to provide support for, or even to be aware of, the activities of the hardware security agent 102. That is, the target network site 106 simply receives the normal, expected confidential credentials of the user of the system 100, and returns an appropriate response thereto.

For example, the target network site 106 may provide a message of successful authentication over the network 104, which may thus be received by the network interface 124. In situations in which data received from the target network site 106 does not include confidential or protected data, the data could simply be forwarded to the untrusted computer 110. However, in any scenarios in which received data is potentially confidential, the alias handler 128 may be utilized to provide a substitution for such confidential data, using an appropriate, corresponding alias from within the alias storage 118. For example, if the target network site 106 is trusted to store credit card information of the user, the alias handler 128, e.g., the substitution manager 134, may substitute an actual credit card number with an alias known to the user to correspond to the credit card number (e.g., a simplified alias such as "my VISA card").

In various example implementations, the hardware security agent 102 may communicate with the user, at either the trusted computer 108 and/or the untrusted computer 110, utilizing available browser functionality at either or both computers. Additionally, or alternatively, the hardware security agent 102 may provide a separate, e.g., proprietary, graphical user interface (GUI) which enables the user to, e.g., manage aliases, or otherwise manage or configure the hardware security agent 102. In this regard, the hardware security agent 102 is illustrated as including a view generator 136, which may thus be understood to provide the type of separate, proprietary GUI, and/or to interact with standard browser functionality of either or both of the computers 108, 110 (e.g., as an extension thereof).

Thus, as described, the hardware security agent 102 is understood to represent a portable, physical component, so that the user of the system 100 may be expected to maintain a physical safety and security of the hardware security agent 102. As long as the hardware security agent 102 is maintained in such a secure fashion, no malicious user will have the physical access needed to obtain confidential information, e.g., from within the alias storage 118.

Nonetheless, in order to guard against scenarios in which the user of the system 100 inadvertently loses or misplaces the hardware security agent 102, or situations in which the hardware security agent 102 is stolen from the user, an authentication engine 128 may be included within the hardware security agent 102. For example, the hardware security agent 102 may be provided with its own username/password combination, which is thus required of the user of the system 100 to access the hardware security agent 102. Of course, other authentication techniques, such as biometric techniques, also may be utilized.

Thus, for example, in practice, the user may initially configure the alias generator 116 and the alias storage 118, using the trusted computer 108 and the configuration interface 120, by first entering the appropriate username/password combination, perhaps by way of a GUI provided by the view generator 136, for authentication thereof by the authentication engine 138. Similarly, at a later time, in which the user utilizes the untrusted computer 110 to communicate over the network 104, the user may again be required to submit the required username/password credentials, for authentication thereof by the authentication engine 138.

Figure 2:
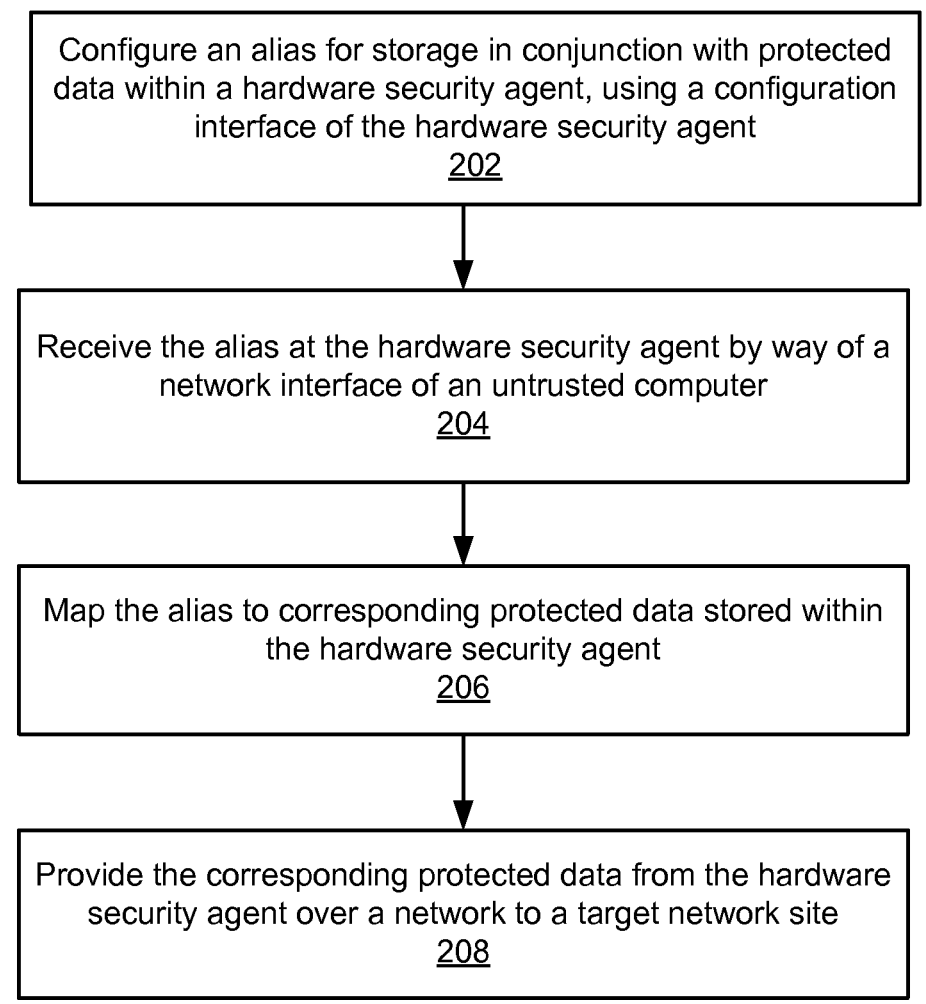
FIG. 2 is a flowchart illustrating example operations of the system of FIG. 1.

FIG. 2 is a flowchart 200 illustrating example operations of the system 100 of FIG. 1. As described below, FIG. 2 illustrates a generalized, high-level description of example operations of the system 100 of FIG. 1, which are not considered to be limiting or exhaustive. More detailed example operations of individual operations of FIG. 2 are provided below, e.g., with respect to FIGS. 3-6. Thus, for example, although the flowchart 200 illustrates the operations 202-208 as separate, sequential operations, it may be appreciated that, in operation, any two or more of the operations 202-208 may be executed in a partially or completely overlapping or parallel manner, and/or in a nested, iterative, looped, or branched manner. Further, it may be appreciated that various additional or alternative operations may be included, while one or more of the operations 202-208 may be omitted in the context of any particular example implementation.

In the example of FIG. 2, an alias may be configured for storage in conjunction with protected data within a hardware security agent 102, using a configuration interface of the hardware security agent 102 (202). For example, as described above, the alias generator 116 may communicate with the trusted computer 108 by way of the configuration interface 120, to thereby receive an alias to be stored in conjunction with, e.g., user credentials for accessing the user's account at the target network site 106.

At a later time, e.g., when the user is utilizing untrusted computer 110, and wishing to access the target network site 106 over the network 104, the previously-generated alias may be received at the hardware security agent 102 by way of a network interface of the untrusted computer 110 (204). For example, as described, the user may utilize the untrusted computer 110, e.g., may use a browser provided by the untrusted computer 110, to access the website which the user wishes to access, i.e., the target network site 106. As described and illustrated with respect to FIG. 1, the hardware security agent 102 may be connected to mediate interactions between the untrusted computer 110 and the target network site 106, through connections to the network interfaces 122, 124 of the hardware security agent 102. Then, a standard request to access the target network site 106 may be intercepted, and inspected, to thereby determine and extract the alias included therein by the user.

Thereafter, the alias may be mapped to the corresponding protected data stored within the hardware security agent 102 (206). For example, the mapper 132 may map the received alias, in conjunction with the identified target network site 106, with corresponding authentication credentials stored within the alias storage 118 for accessing the target network site 106.

Then, the corresponding protected data may be provided from the hardware security agent 102, over the network 104, to the network site 106 (208). For example, the substitution manager 134 may substitute the corresponding protected data for the alias within a request sent to the target network site by way of the network interface 124.

Figure 3:
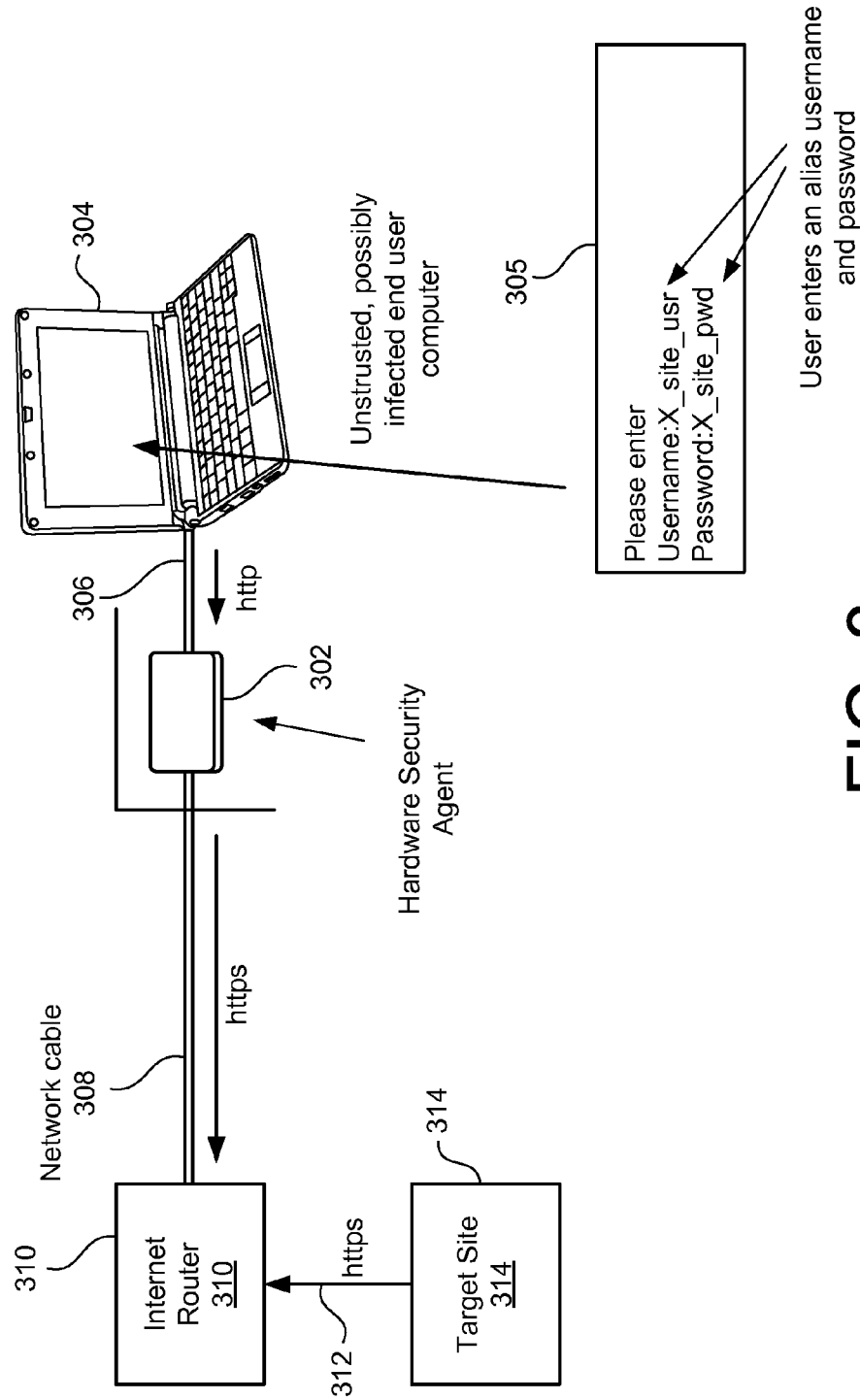
FIG. 3 is a block diagram of a more detailed example implementation of the system of FIG. 1, illustrating a use of the system of FIG. 1 to request access to a selected network site.

Consistent with the above illustrations and explanations of FIGS. 1-2, FIG. 3 illustrates an example implementation of a hardware security agent 302, connected to an untrusted, possibly infected computer 304 by way of hard-wired connection 306. As further shown, the hardware security agent 302 may also be connected to a hard-wired connection 308, and thus to an internet router 310 as a connection 312 to a target site 314.

As illustrated in FIG. 3, a display 305 of the untrusted computer 304 may request entry of a previously-configured alias, e.g., an alias username and password. In the example, the username x_site_usr represents an alias for a username of the user for the target site 314, while a password x_site_pwd represents an alias for a password for the target site 314.

As referenced above in the description of FIG. 1, and described in more detail below with respect to FIG. 5, the connection 306 may be used to transmit a non-secure hypertext transfer protocol (HTTP) request. As referenced, the HTTP request over the connection 306 need not be secure, since the computer 304 is untrusted. Moreover, the connection 306 may be understood to represent, e.g., a short cable that is entirely within the view and control of the user of the untrusted computer 304 and the hardware security agent 302.

Upon inspection of the HTTP request and substitution for the alias username and passwords submitted by way of display window 305, the actual authentication credentials may be replaced within the HTTP request and transmitted as a secure HTTP request (HTTPS), using the connection 308. More specifically, for example, the network connector 126 of FIG. 1 may be utilized to implement a Transport Layer Security (TSL) HTTPS connection, using an appropriate TSL HTTPS handler or other suitable component.

As shown in FIG. 3, the secure HTTP request may be routed by the internet router 310 to the target site 314, which receives the secure HTTP request, including the actual authentication credentials of the user, and proceeds to authenticate the user in an otherwise-normal fashion.

As illustrated in FIG. 3, and referenced above with respect to FIG. 1, a user utilizing the untrusted computer 304 in a public setting, such as an internet café or coffee shop, may simply unplug a hard-wired connection at a network port of the untrusted computer 304, so as to insert the hardware security agent 302 in a mediating position between the untrusted computer 304 and the internet router 310, as illustrated in FIG. 3. For example, in a public setting in which a public, untrusted computer is connected by Ethernet cable to the internet router 310, the user may simply unplug the Ethernet cable, and thereafter plug the removed Ethernet cable into the hardware security agent 302 to establish the connection 308 (i.e., may create the connection 308 utilizing the network interface 124 of FIG. 1). Meanwhile, the user may simply plug Ethernet cable between the untrusted computer 304 and the hardware security agent 302 (i.e., using the network interface 122 of FIG. 1), to thereby establish the hard-wired connection 306.

Figure 4:
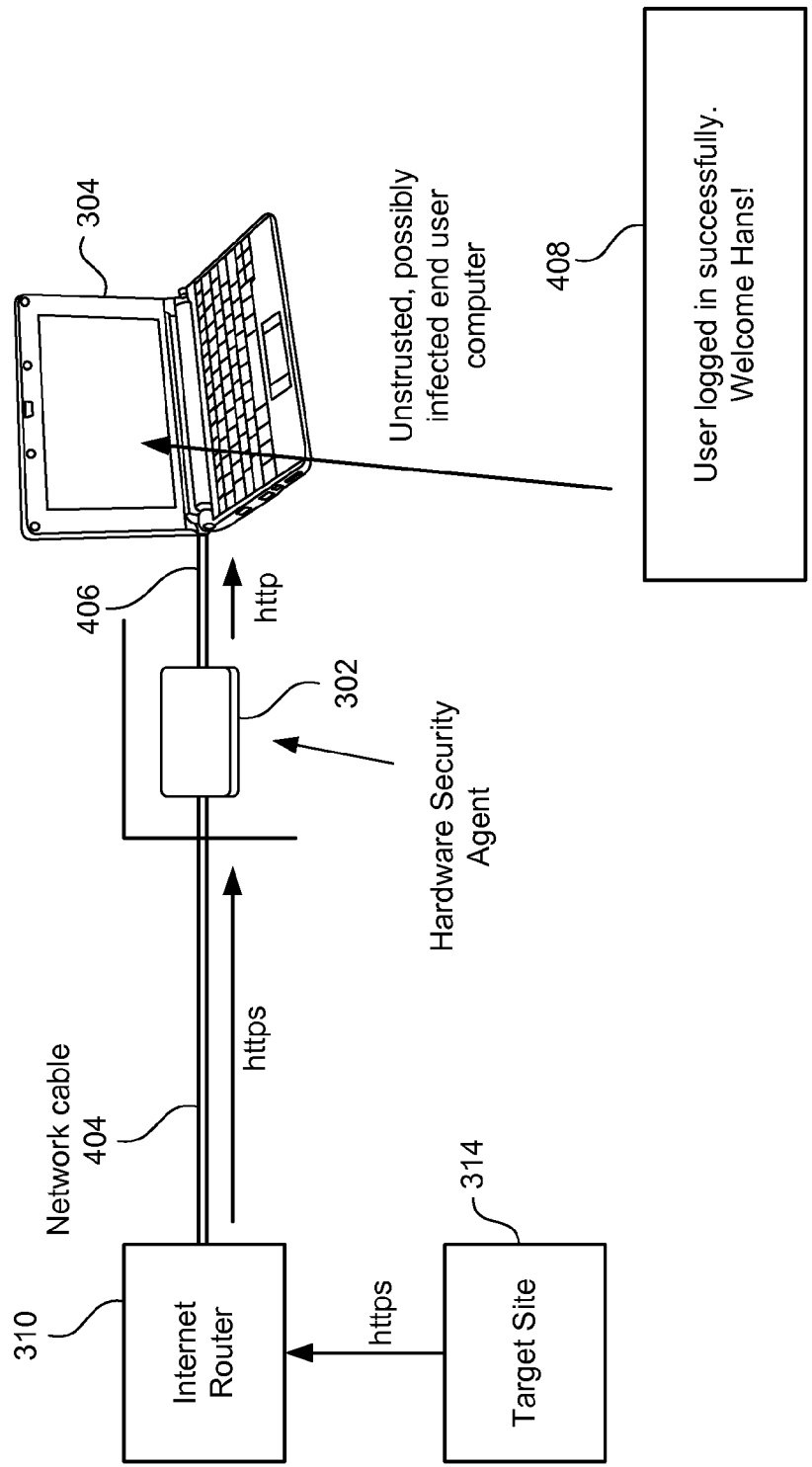
FIG. 4 is a block diagram of the system of FIG. 3, illustrating an example implementation in which a response is received from the network site.

FIG. 4 is a block diagram corresponding to the example of FIG. 3, and illustrates a scenario in which a response is received from the target site 314. As shown, upon receipt of the actual authentication credentials of the user, as described above with respect to FIG. 3, the target site 314 may respond (e.g., may provide an indication of successful authentication) by way of a secure HTTP connection 402 between the target site 314 and the internet router 310. Then, the internet router 310 may conventionally forward the response, by way of a secure HTTP connection 404. The hardware security agent 302 may receive the response for forwarding by way of a standard HTTP connection 406 to the untrusted computer 304. In this way, as illustrated by a display window 408, the response may be displayed to the user at the untrusted computer. In the example, the display window 408 provides a message that the user has successfully been logged in at the target site 314.

As already described, if the target site 314 provides a response that does not include any protected data associated with an alias within the alias storage 118 of the hardware security agent 302, then the hardware security agent 302 may simply forward the response from the target site 314 to the untrusted computer 304. However, in scenarios in which responses from the target site 314 include protected data, then the alias handler 128 may handle the response accordingly. That is, as described, the request inspector 130 may determine inclusion of protected data within the provided response, while the mapper 132 may relate the protected data to an alias within the alias storage 118. Finally, the substitution manager 134 may execute substitution of the protected data with the corresponding alias, for inclusion of the alias within the response as provided by way of the connection 406 to the untrusted computer 304.

Figure 5:
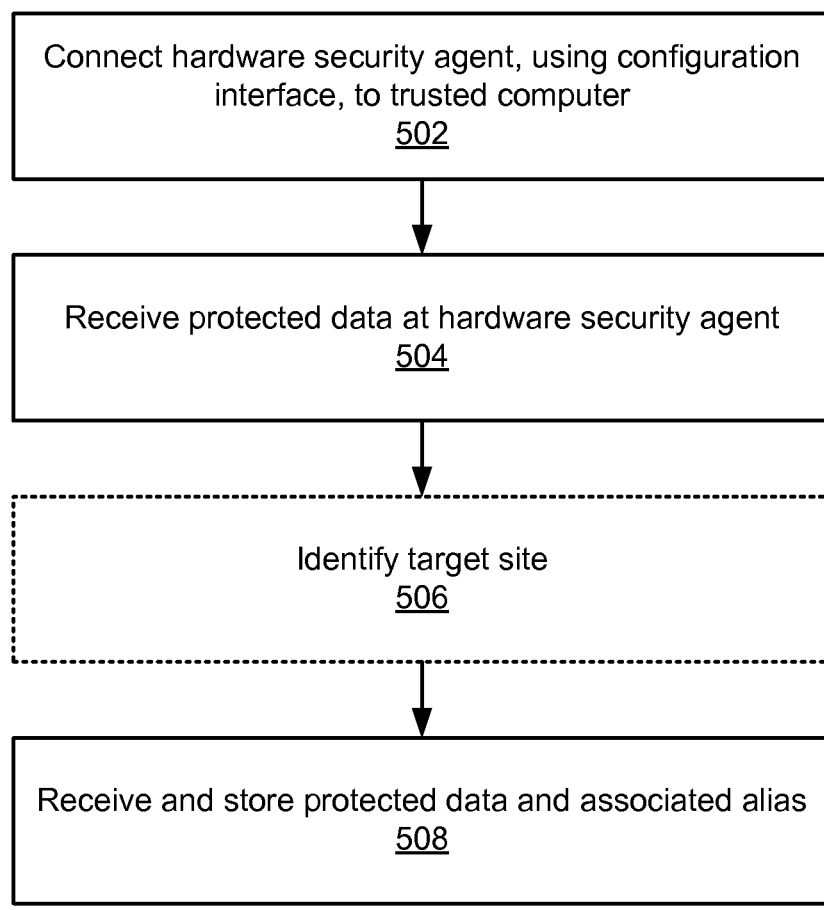
FIG. 5 is a flowchart illustrating example operations of the systems of FIGS. 1 and 3.

FIG. 5 is a flowchart 500 illustrating example operations for configuring the hardware security agent 102, 302 with a new alias. As illustrated with respect to FIG. 5, the flowchart 500 may begin with a connection of the hardware security agent, by way of its configuration interface, to a trusted computer (502). That is, for example, a user at his or her home computer may simply connect the hardware security agent 102, 302, by way of the configuration interface 120, and using, e.g., a USB connection, to thereby connect the trusted computer 108 (i.e., the home computer).

The hardware security agent 102, 303 (e.g., the alias generator 116) may thus receive protected data (504). For example, the view generator 136 may provide a graphical user interface to the user, requesting entry and identification of protected data. For example, such an interface may ask the user to classify the type of protected data (e.g., authentication credentials or credit card information), and may thereafter receive the protected data (i.e., the actual credentials, or the credit card number/expiration date).

If the protected data is associated with a target network site, then the target site may be identified (506). For example, again using an appropriate graphical user interface, the user may be permitted to identify a URL (uniform resource locator) or other identifier of the network site or network resource in question. In scenarios in which the protected data includes authentication credentials, the hardware security agent 102, 303 may proceed to execute authentication of the user at the target site, in order to verify the provided credentials.

Finally in FIG. 5, the protected data may be received and stored in conjunction with an associated alias (508). For example, the user may enter credit card information, or authentication credentials, and then may be prompted, again using an appropriate graphical user interface, to enter an alias for each type of protected data. In some example implementations, potential aliases may be suggested to the user. Additionally, or alternatively, the user may simply be free to enter any alias which the user considers to be easily remembered. In this way, the alias storage 118 may be created and configured. Of course, the user is free to alter any alias or associated protected data at any time, subject to the caveat that the user may be required to go through an authentication process with respect to the hardware security agent 102, 302 itself, as illustrated and described above with respect to the authentication engine 138 of the hardware security agent 102 of FIG. 1.

Figure 6:
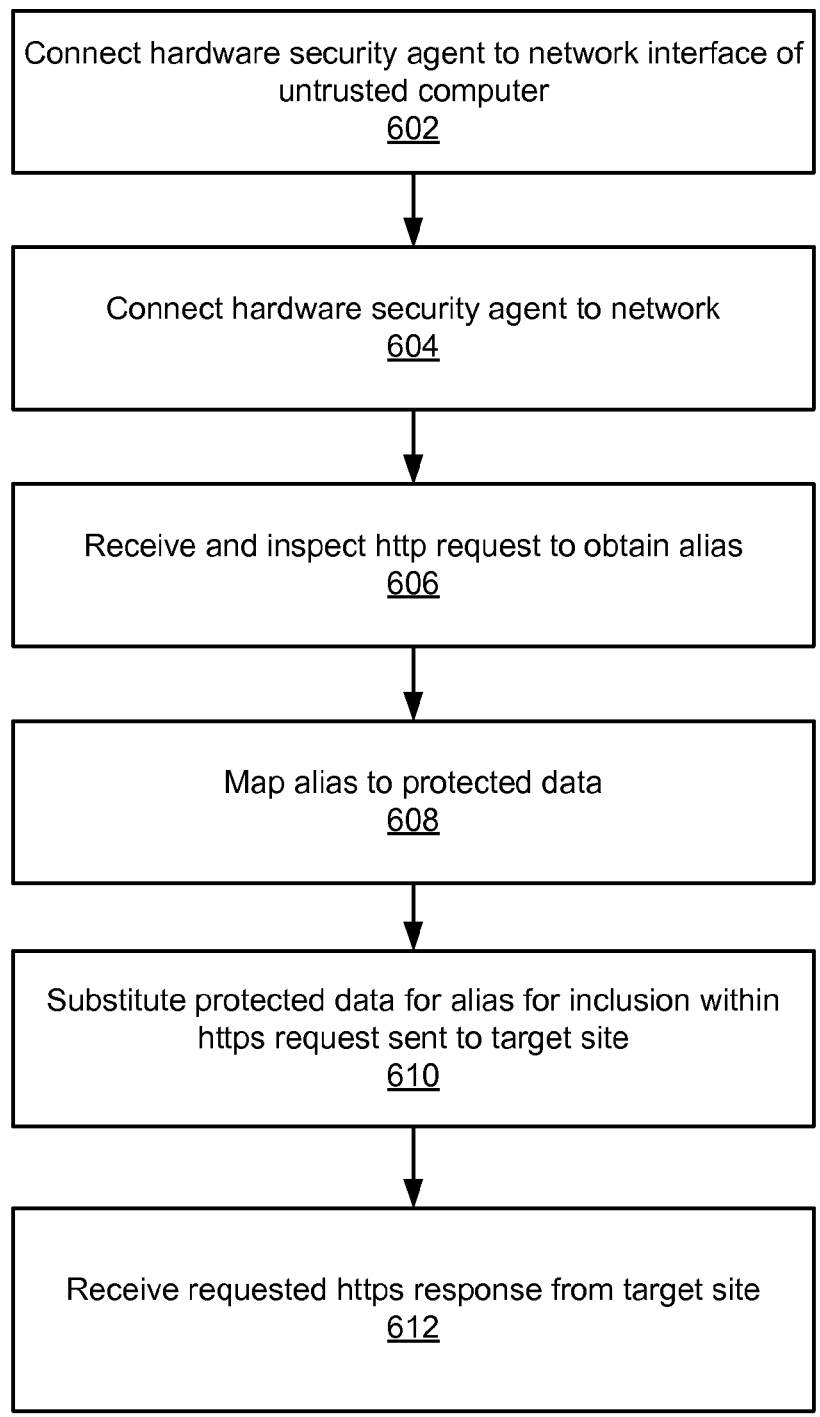
FIG. 6 is a flowchart illustrating example operations of the systems of FIGS. 1 and 4.

FIG. 6 is a flowchart 600 illustrating example operations of the hardware security agent 102, 302 in mediating communications between an untrusted computer and a target network site. As illustrated and described above, the process may begin with a connection of the hardware security agent 102, 302, by way of its network interface 122, to a network interface of the untrusted computer (602). Meanwhile, by way of the second network interface 124, the hardware security agent 102, 302 may be connected to the network (604).

In the examples of FIGS. 3 and 4 above, such a connection is illustrated as a hard-wired Ethernet connection between the hardware security agent 302 and the internet router 310. However as referenced above with respect to FIG. 1, the network connection also may be made using a wireless LAN connection of the network connector 126. In that case, it is assumed that the user at the untrusted computer has been provided with the wireless network password, which may thus be utilized by the WLAN adaptor at the network connector 126 to connect to the network by way of a wireless connection.

Once connected, the user at the untrusted computer may simply proceed to the desired target network site in a normal fashion. For example, the user may simply enter a URL of the target site, or may select the target site from a bookmark or favorites list. Upon arriving at a sign-in page for the desired network site, the user may be requested, in an otherwise-normal fashion, to enter authentication credentials. At this point, the user may enter an alias username and an alias password, as described and illustrated above with respect to the display window 305 of FIG. 3.

In this way, the hardware security agent 102, 302 may receive an otherwise-standard HTTP request from the user at the untrusted computer, and may proceed to inspect the HTTP request to obtain the alias therefrom (606). For example, the request inspector 130 may be configured to analyze the HTTP request for identifying portions thereof that are likely to be associated with inclusion of the alias. For example, the request inspector 130 may detect a GET parameter associated with the relevant URL, and/or may detect a POST parameter, both of which are common but non-limiting examples of the types of HTTP commands that may be included in the HTTP request in conjunction with submission of authentication credentials.

Once the received alias has been identified in this fashion, the alias may be mapped to its corresponding protected data within the alias storage 118 (608). For example, as described, the mapper 132 may execute such mapping in the context of the alias handler 128 of the hardware security agent 102.

Thereafter, the protected data may be substituted for the alias, for inclusion within a HTTPS request to be sent to the target site (610). That is, as illustrated above with respect to FIG. 3, such a secure HTTP request, including the substituted authentication credentials, may be forwarded to the target site 314.

In this way, the target site may receive an otherwise-standard secure HTTP request which includes the expected authentication credentials. Consequently, the target site may proceed with authentication of the user in a normal fashion, and may forward a confirmation of authentication in response, also in a standard fashion.

Upon receipt of the standard response from the target site 314 by way of a secure HTTP connection (612), the hardware security agent 102, 302 may execute a similar process in inspecting the received secure HTTP response, as described above with respect to inspection of the original HTTP request from the untrusted computer. That is, the request inspector 130 of the alias handler 128 may inspect the received response for possible inclusion of protected data that is associated with an alias within the alias storage 118. If no such protected data is detected, then the response may simply be forwarded to the untrusted computer. However, if such protected data is detected, then the mapper 132 may relate the protected data to a corresponding alias, and the substitution manager 134 may replace the protected data with the corresponding alias when providing the response to the user by way of the untrusted computer.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A hardware security agent including instructions recorded on a nontransitory computer-readable medium, and executable by at least one processor, the hardware security agent comprising:
   a request inspector configured to receive an alias at the hardware security agent by way of a network interface of an untrusted computer;
   a mapper configured to map the alias to corresponding protected data stored within the hardware security agent; and
   a substitution manager configured to provide the corresponding protected data from the hardware security agent over a network to a target network site.

2. The hardware security agent of claim 1, comprising an alias generator configured to receive the alias from a user for storage in conjunction with the protected data within the hardware security agent, using a configuration interface of the hardware security agent.

3. The hardware security agent of claim 2, wherein the configuration interface is not connected to the network and is connected to a corresponding interface of a trusted computer to receive the alias.

4. The hardware security agent of claim 1, wherein the protected data includes authentication credentials of a user of the hardware security agent for accessing a user account at the target site.

5. The hardware security agent of claim 1, wherein the protected data includes financial information of a user of the hardware security agent sent to the target network site to facilitate a transaction therewith.

6. The hardware security agent of claim 1, wherein the request inspector is further configured to receive the alias from within an intercepted network request designated for the target network site.

7. The hardware security agent of claim 6, wherein the substitution manager is configured to substitute the protected data for the alias within the intercepted network request, to provide a secure network request in a standard form expected by the target network site.

8. The hardware security agent of claim 1, wherein the request inspector is configured to:
   receive a response from the target network site after receipt of the protected data thereby;
   inspect the response for inclusion of additional protected data therein; and
   substitute the additional protected data with a corresponding additional alias.

9. The hardware security agent of claim 1, further comprising an authentication engine configured to require authentication of a user of the hardware security agent before providing access thereto to the user.

10. A computer-implemented method for executing instructions stored on a non-transitory computer readable storage medium, the method comprising:
    receiving an alias at a hardware security agent by way of a network interface of an untrusted computer;
    mapping the alias to corresponding protected data stored within the hardware security agent; and
    providing the corresponding protected data from the hardware security agent over a network to a target network site.

11. The method of claim 10, further comprising receiving the alias from a user for storage in conjunction with the protected data within the hardware security agent, using a configuration interface of the hardware security agent, wherein the configuration interface is not connected to the network and is connected to a corresponding interface of a trusted computer to receive the alias.

12. The method of claim 10, wherein receiving the alias comprises receiving the alias from within an intercepted network request from the untrusted computer designated for the target network site.

13. The method of claim 12, wherein providing the corresponding protected data comprises:
    substituting the protected data for the alias within the intercepted network request; and
    providing a secure network request in a standard form expected by the target network site.

14. The method of claim 10, further comprising:
    receiving a response from the target network site after receipt of the protected data thereby;
    inspecting the response for inclusion of additional protected data therein; and
    substituting the additional protected data with a corresponding additional alias.

15. A computer program product, the computer program product being tangibly embodied on a non-transitory computer-readable storage medium and comprising instructions that, when executed, by at least one processor, cause the at least one processor to:
    receive an alias at a hardware security agent by way of a network interface of an untrusted computer;
    map the alias to corresponding protected data stored within the hardware security agent; and
    provide the corresponding protected data from the hardware security agent over a network to a target network site.

16. The computer program product of claim 15, wherein the instructions, when executed, cause the at least one processor to receive the alias from a user for storage in conjunction with the protected data within the hardware security agent, using a configuration interface of the hardware security agent.

17. The computer program product of claim 16, wherein the configuration interface is not connected to the network and is connected to a corresponding interface of a trusted computer to receive the alias.

18. The computer program product of claim 15, wherein the instructions, when executed, cause the at least one processor to receive the alias from within an intercepted network request designated for the target network site.

19. The computer program product of claim 18, wherein the instructions, when executed, cause the at least one processor to substitute the protected data for the alias within the intercepted network request, to provide a secure network request in a standard form expected by the target network site.

20. The computer program product of claim 15, wherein the instructions, when executed cause the at least one processor to:
   receive a response from the target network site after receipt of the protected data thereby;
   inspect the response for inclusion of additional protected data therein; and
   substitute the additional protected data with a corresponding additional alias.

* * * * *